J. RANEY.

Improvement in Water-Wheels.

No. 4,984. Reissued July 16, 1872.

Witnesses:
R. C. Wrenshall
James I. Kay.

Inventor:
James Raney,
by Bakewell, Christy & Kerr
his Att'ys

AM. PHOTO-LITHOGRAPHIC CO. N.Y. (OSBORNE'S PROCESS.)

UNITED STATES PATENT OFFICE.

JAMES RANEY, OF NEWCASTLE, PENNSYLVANIA.

IMPROVEMENT IN WATER-WHEELS.

Specification forming part of Letters Patent No. 72,680, dated December 24, 1867; reissue No. 4,984, dated July 16, 1872.

SPECIFICATION.

*To all whom it may concern:*

Be it known that I, JAMES RANEY, of Newcastle, in the county of Lawrence and State of Pennsylvania, have invented a new and useful Improvement in Water-Wheels; and I do hereby declare the following to be a full, clear, and exact description thereof, reference being had to the accompanying drawing making a part of this specification, in which—

Figure 1:
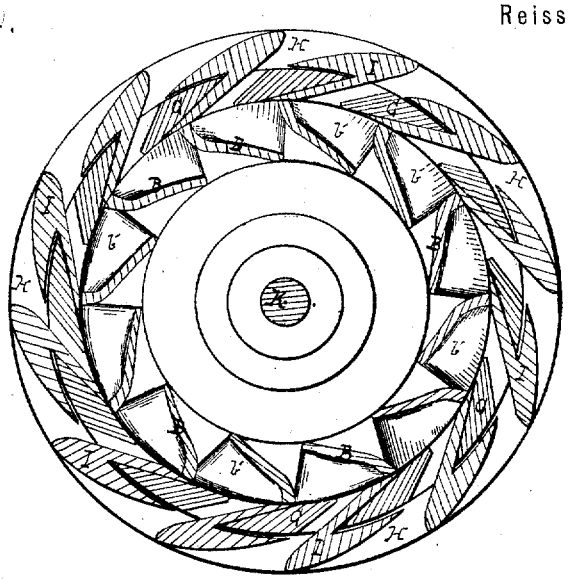
Figure 3:
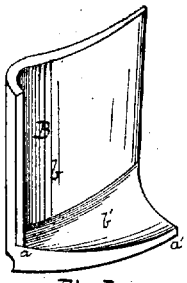
Figure 2:
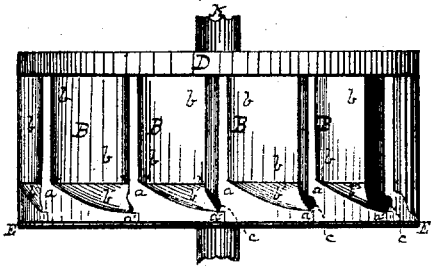
Figure 4:
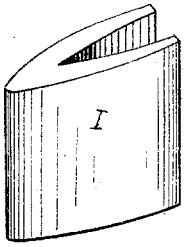

Figure 1 is a horizontal sectional view of a water-wheel and casing illustrative of my improvement. Fig. 2 is an edge view of the wheel without the casing. Fig. 3 is a detached view in perspective of one of the buckets; and Fig. 4 is a like view of one of the partitions of the casing.

Like letters of reference indicate like parts in each.

In the construction of what are commonly known as reaction water-wheels it is important that the following elements should be combined or united: First, a maximum area of injet. Second, a maximum area of bucket-surface subject to the impact of the water; and third, such an area of discharge and so arranged relatively to the bucket surface that the water, as soon as its force is spent, will escape as dead water, and without lessening the force or effect of the inflowing current.

My improvement relates to this class of wheels, and consists in a construction of a water-wheel and bucket designed and adapted to effect the above-named desiderata to the fullest extent.

To enable others skilled in the art to make and use my invention, I will proceed to describe its construction and mode of operation.

The wheel is designed to stand horizontally, and is operated by a shaft, K, which is provided with suitable bearings at both its upper and lower ends. On the under side of the top plate D, and around its periphery, is arranged a series of buckets, B. Each bucket B has a vertical face, *b*, slightly concave, as shown on the side that receives the impact of the inflowing current. This vertical face terminates a little short of the lower plane of the wheel, and the remainder of the bucket consists of a bottom, *b'*, which widens gradually from the point of injet to the discharge point or heel, and also slopes downwards, substantially as shown, to or nearly to the lower plane of the wheel. The face of this bottom in the radial line of the wheel is horizontal, or nearly so, whereby an increased area of discharge is attained; but as sharp angles in surfaces over which fluids are to pass are commonly objectionable, I prefer to have the vertical and bottom faces gradually run into each other by a curve of greater or less radius, as may be preferred. Each bucket at the point *a'*, in the outer periphery of its bottom, abuts against or is connected with the next bucket, and a rigid connection of the whole series is effected by a rim connection, *e*, which unites them together at the point of junction. The outer edge of the bottom *e*, instead of rising in a vertical rim to obstruct the inflow of water, slopes backward from the point *a* to or nearly to the point *a'*, where the bottom joins the next bucket. The lower face of the bottom *b'* has also an incline corresponding to the upper face, so as to leave not only a vertical but also a free lateral discharge, as shown at *c*.

I am aware that buckets have been made with vertical curved faces and curved bottoms of various forms, but with a rim which covered so much of the outer periphery of the whole as lies below the line *x x*. The effect of this rim is to lessen by so much the area of injet. By connecting one bucket directly with the next, as shown and described, I am enabled to dispense with such rim, and by making the bottom *b'* horizontal, or nearly so, measuring radially, I secure an increased area of discharge proportionate to the increased area of injet which is effected by dispensing with the rim last above referred to.

The bucket described is surrounded by a stationary case, to which is fastened a series of wings or partitions, G, between its upper and lower rims, and which are arranged equidistant apart, one for each bucket of the wheel. Outside the case F is an adjustable case, H, which is provided with a corresponding series of V-shaped partitions, I. By shifting the case H the supply of water to the buckets B is regulated at pleasure.

What I claim as my invention, and desire to secure by Letters Patent, is—

1. A series of water-wheel buckets in which the area of injet of each bucket shall extend below the lower edge of its vertical face, and in which the buckets shall also be connected together around the lower edge of the outer periphery, substantially as described.

2. The connection of bucket with bucket, combined with a sloping bottom, which is uncovered on the inlet side, whereby the water acts by impact not only on the vertical face of the wheel, but also on the bottom, substantially as set forth.

3. In a water-wheel bucket, the bottom $b'$, horizontal, or nearly so, measured radially, such bottom widening and sloping downward from the inlet to the discharge, and being open along the whole or the greater part of its wide discharging end, so as to secure a maximum area of water discharge, substantially as described.

4. A series of water-wheel buckets, connected each to each in the manner set forth, each bucket having its vertical and bottom faces open to the impact of the water and an unobstructed discharge, substantially as set forth.

In witness whereof, I, the said JAMES RANEY, have hereunto set my hand.

JAS. RANEY.

Witnesses:
G. H. CHRISTY,
W. N. HOWARD.